(12) United States Patent
Chen

(10) Patent No.: US 7,800,045 B2
(45) Date of Patent: Sep. 21, 2010

(54) OPTICAL MODULE AND COMPUTER INPUT APPARATUS WITH IMPROVED CAPABILITY OF OPTICAL RECOGNITION

(75) Inventor: Hui-Hsuan Chen, Hsin-Chu Hsien (TW)

(73) Assignee: PixArt Imaging Inc., Science-Based Industrial Park, Hsin-Chu Hsien (TW)

( * ) Notice: Subject to any disclaimer, the term of this patent is extended or adjusted under 35 U.S.C. 154(b) by 859 days.

(21) Appl. No.: 11/555,692

(22) Filed: Nov. 2, 2006

(65) Prior Publication Data

US 2007/0273654 A1 Nov. 29, 2007

(30) Foreign Application Priority Data

May 23, 2006 (TW) .............................. 95208894 U

(51) Int. Cl.
*H01J 40/14* (2006.01)
*G06F 3/033* (2006.01)

(52) U.S. Cl. ...................... 250/221; 250/216; 345/156; 345/157; 345/163; 345/166

(58) Field of Classification Search ................ 345/156, 345/157, 163, 166; 250/216, 221
See application file for complete search history.

(56) References Cited

U.S. PATENT DOCUMENTS

| | | | |
|---|---|---|---|
| 6,421,045 B1 * | 7/2002 | Venkat et al. ............... 345/167 |
| 6,531,692 B1 * | 3/2003 | Adan et al. .................. 250/221 |
| 6,927,759 B2 * | 8/2005 | Chang et al. ................ 345/166 |
| 7,131,751 B1 * | 11/2006 | Theytaz et al. .............. 362/396 |
| 7,629,962 B2 * | 12/2009 | Chiu et al. ................... 345/166 |
| 2003/0142075 A1 * | 7/2003 | Chin ........................... 345/163 |
| 2005/0127390 A1 * | 6/2005 | Lin et al. ..................... 257/100 |
| 2006/0007148 A1 * | 1/2006 | Theytaz et al. .............. 345/163 |
| 2006/0125792 A1 * | 6/2006 | Chien .......................... 345/166 |
| 2006/0126331 A1 * | 6/2006 | Chien .......................... 345/166 |

* cited by examiner

*Primary Examiner*—My-Chau T Tran
(74) *Attorney, Agent, or Firm*—Winston Hsu

(57) ABSTRACT

An optical module of an optical mouse includes a light source, a light-guiding unit having a fixing portion, a first lens and a second lens. A housing of the light source includes a substantially plane light-emitting surface, and the light-guiding unit guides light emitted by the light source. The fixing portion is disposed on one side of the light-guiding unit for fastening the light source. The first lens is disposed on one side of the fixing portion close to the light-guiding unit for focusing the light emitted by the light source onto a working surface. The second lens is disposed on an optical path between the light source and the first lens using injection molding for focusing the light provided by the light source onto a focal point of the first lens.

14 Claims, 5 Drawing Sheets

OPTICAL MODULE AND COMPUTER INPUT APPARATUS WITH IMPROVED CAPABILITY OF OPTICAL RECOGNITION

BACKGROUND OF THE INVENTION

1. Field of the Invention

The present invention relates to an optical module and a computer input apparatus, and more particularly, to an optical module and an optical mouse capable of improving optical recognition.

2. Description of the Prior Art

With the fast progress of the industry of personal computer, applications of the mice have changed from traditional mechanical rolling ball mice to optical mice with optical sensing components. The principle of the traditional mechanical rolling ball mice is very simple and the price is cheap, but dust and dirt are easily brought into the rolling ball causing malfunction as operating of the mouse. It is very inconvenient for users to clear up the rolling ball frequently. The optical mouse with ripe technology and reasonable price has already replaced the traditional mechanical rolling ball mouse gradually. Because the optical mouse dose not need to clear up, difficult to wear and tear, and always keeps a high accuracy for a long time, it has already become the main product in the whole world market.

Please refer to FIG. 1, which is a bottom view of an optical mouse 100 according to the prior art. The optical mouse 100 comprises a bottom surface 12 and a housing 14. The bottom surface 12 includes an opening 16. An optical module (not shown) and an optical sensing device (not shown) are disposed within the optical mouse 100, wherein the optical module is capable of emitting light and projects the light through the opening 16 onto a working plane 11 (shown in FIG. 2) on which the optical mouse 100 is working, and the optical sensing device is capable of comparing a difference between two consecutive images displayed on the working plane 11 by scanning and capturing the images. Every time when the contents of the captured images are changed, the optical mouse 100 uses an inner circuit to calculate moving information (including moving direction and moving distance), and transform them into an axis displacement signal, then transmits via a interface 18 (or wirelessly) to a computer(not shown). The interface 18 is an universal serial bus, USB, or a IEEE 1394, or other interfaces.

Please refer to FIG. 2, which is a side view inside the optical mouse 100 in FIG. 1 according to the prior art. The optical mouse 100 further comprises a light source 20, a light sensing component 21, a circuit board 22, a clipper 23, a light guiding part 24, and a lens 25. The opening 16 is disposed on the bottom surface 12, and an aperture 26 is disposed on the light guiding part 24, and a hole 36 is disposed on the circuit board 22. The opening 16, the aperture 26, and the hole 36 are disposed on an optical path between the light source 20 and the light sensing component 21(shown as the dotted line in FIG. 2). The lens 25 is disposed inside the aperture 26 and below the hole 36. The light sensing component 21 is disposed above the hole 36 of the circuit board 22 and corresponding to the lens 25. The light guiding part 24 includes a first total reflection surface 27 and a second total reflection surface 28 to reflect light 37 emitted by the light source 20 onto the working surface 11. The first total reflection surface 27 protrudes the hole 36 of the circuit board 22 such that the first total reflection surface 27 locates properly between the light source 20 and the light sensing component 21. The clipper 23 prevents the light 37 emitted by the light source 20 from directly emitting to the light sensing component 21, and therefore most parts of the light 37 travels toward the first total reflection surface 27, and is total-reflected by the first total reflection surface 27 to the second total reflection surface 28. After total-reflected by the second total reflection surface 28, the light 37 travels through the opening 16 of the bottom surface 12 to project onto the working surface 11 on which the optical mouse 100 works. The light 37 is scattered and reflected by the working surface 11 and a reflected light 38 travels through the opening 16 and is focused by the lens 25 on the light sensing component 21. By this way, the light sensing component 21 can determine a moving direction and distance of the optical mouse 100 according to a change of the reflected light 38.

The light source 20 is disposed on the circuit board 22, i.e. the relative position of the light source 20 and the light guiding part 24 would change according to such kinds of factors as position, height, inclination thereof, so the position of the working surface 11 which the light 37 illuminates, and the corresponding reflected light 38 would also change. Therefore, the light sensing component 21 which determines the moving direction and distance of the optical mouse 100 according to the changes of the optical mouse 100 would easily produce errors which result in misbehavior of the optical mouse 100. In order to overcome above-mentioned shortcomings, manufacturers of the optical mice 100 must guarantee carefully that all light sources 20 on the circuit board 22 all have the same position, height, and inclination precisely. Thus the optical mice 100 certainly will have higher manufacturing costs. Even so, the light source 20 unavoidably rocks and vibrates when the optical mouse 100 moves on the working surface 11. As aforementioned shortcomings, users of computers really need an improved optical mouse capable of easily fastening the light source 20 and improving optical recognition when the improved optical mouse travels over the working surface 11.

SUMMARY OF THE INVENTION

It is therefore a primary objective of the claimed invention to provide an optical module for improving optical recognition of an optical mouse in an optical mouse.

The present invention discloses an optical module for an optical mouse which travels over a working surface to detect a relative movement, comprising a light source including a housing having a light-emitting surface, and a light emitting chip, disposed in the housing, for emitting light through the light-emitting surface of the housing, a light-guiding unit for guiding the light emitted by the light source, including a fixing portion forming a fixing space for fastening the light source, a first lens, disposed within the fixing space of the fixing portion, and a second lens, disposed within the fixing space of the fixing portion at a position between the light source and the first lens, wherein the second lens substantially focuses the light emitted by the light source to a focal point of the first lens, and thereby the light after leaving the first lens is incident onto the working surface in a substantially collimated way.

The present invention further discloses an optical mouse which travels over a working surface to detect a relative movement, comprising, a bottom surface for placing on a working surface, including an opening for passing light, a first housing, disposed on the bottom surface and formed an inner space with the bottom surface, a light source, disposed in the inner space, including a second housing having a substantially plane light-emitting surface, and a light emitting chip, disposed in the second housing, for emitting light through the substantially plane light-emitting surface of the second housing, a light-guiding unit, disposed in the housing, including a first aperture facing toward the opening of the bottom surface, and a second aperture for passing the light emitted by the light source, and for passing light reflected from the working surface through the first aperture to the opening of the bottom surface, a fixing portion forming a fixing space for fastening the light source, a first lens, disposed within the fixing space of the fixing portion, and a second lens, disposed within the fixing space of the fixing portion at a position between the light source and the first lens, wherein the second lens substantially focuses the light emitted by the light source to a focal point of the first lens, and thereby the light after leaving the first lens is incident onto the working surface in a substantially collimated way, and an optical sensing device, disposed in the inner space, for sensing the light passing the opening of the bottom surface so as to generate a moving signal which is corresponding to the relative movement of the optical mouse.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
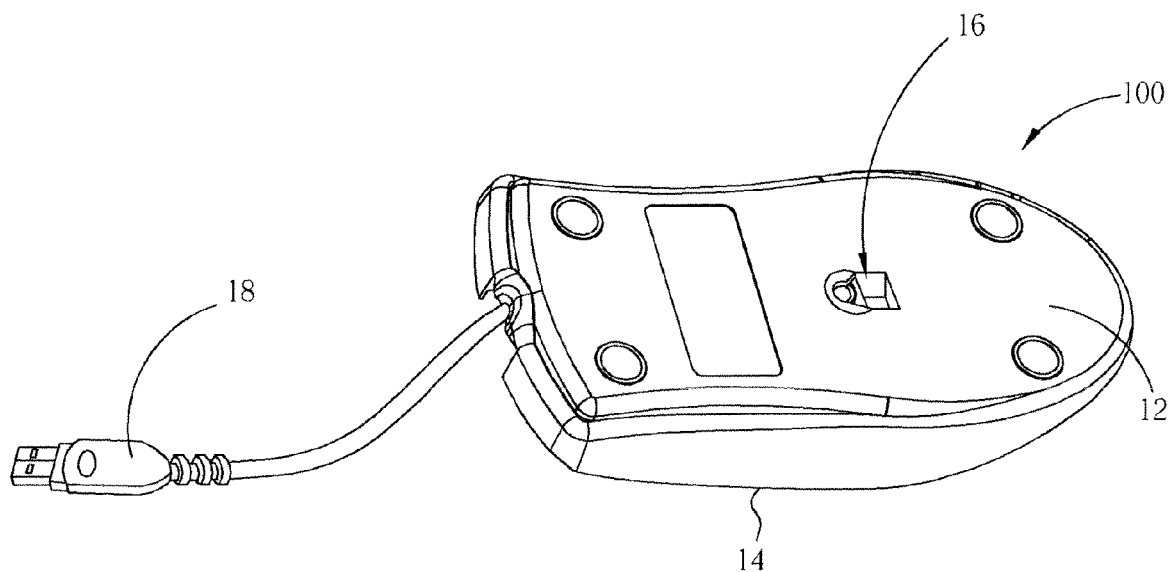
FIG. 1 is a bottom view of an optical mouse according to the prior art
Figure 2:
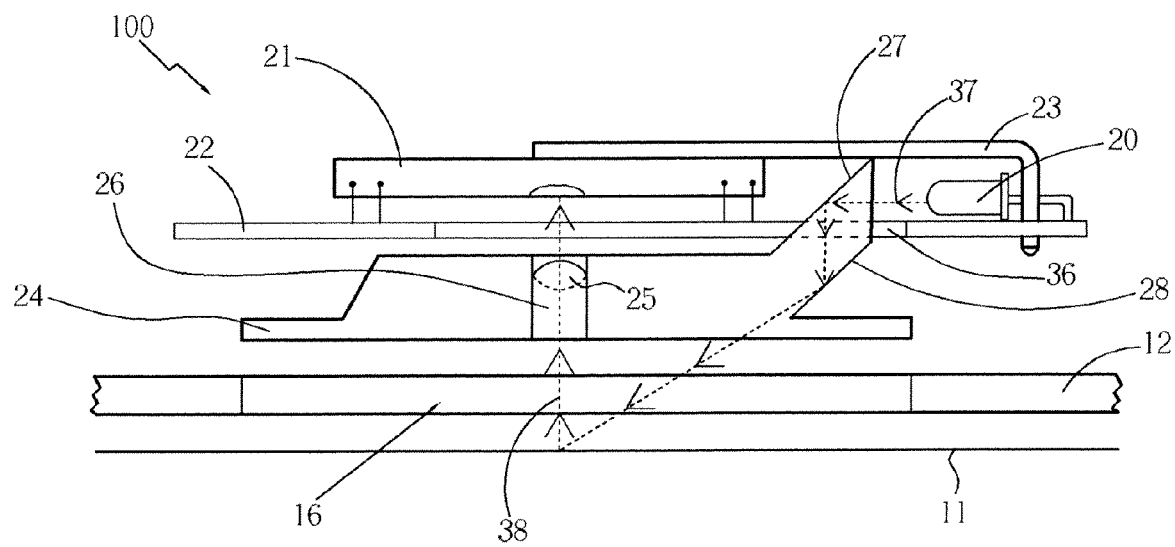
FIG. 2 is a side view inside the optical mouse shown in FIG. 1 according to the prior art.
Figure 3:
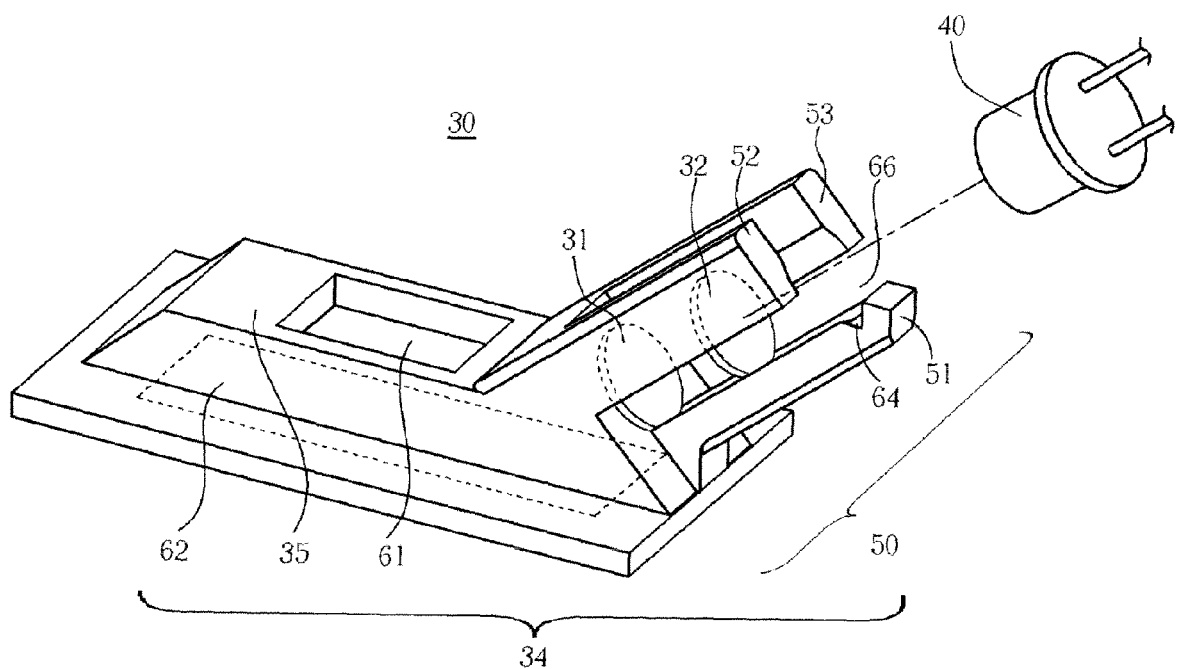
FIG. 3 is a schematic diagram of an optical module for an optical mouse in accordance with a preferred embodiment of the present invention.

Please refer to FIG. 3, which illustrates an optical module 30 of an optical mouse in accordance with an embodiment of the present invention. The optical module 30 comprises a light source 40 for emitting light, a light-guiding unit 34 including a light-guiding portion 35, a fixing portion 50, a first lens 31, a second lens 32, a first aperture 61 disposed on one side of the light-guiding portion 35, and a second aperture 62 disposed on the opposing side of the light-guiding portion 35. The light source is a coherent light source or an incoherent light source. The fixing portion 50 has at least two fixing members to form a fixing space 66 for fastening and accommodating the light source 40. In this embodiment, there are three fixing members, a first fixing member 51, a second fixing member 52, and a third fixing member 53 to form the fixing space 66 capable of fastening and accommodating the light source 40, wherein the first fixing member 51 having an engaging portion 64 for engaging the light source 40 at a desired position. In FIG. 3, the light source 40 has not been fixed within the fixing portion 50 of the light-guiding unit 34 of the optical module 30, and a schematic diagram which the light source 40 is fixed within the fixing space 66 of the fixing portion 50 of the light-guiding unit 34 is described in detail as follows. The first lens 31 is disposed within the fixing space 66 of the fixing portion 50, and the second lens 32 is also disposed within the fixing space 66 of the fixing portion 50 at a position between the light source 40 and the first lens 31, wherein the second lens substantially focuses light(not shown) emitted by the light source 40 to a focal point of the first lens 31, and thereby the light after leaving the first lens 31 is incident onto a working surface(not shown) in a substantially collimated way.

Figure 4:
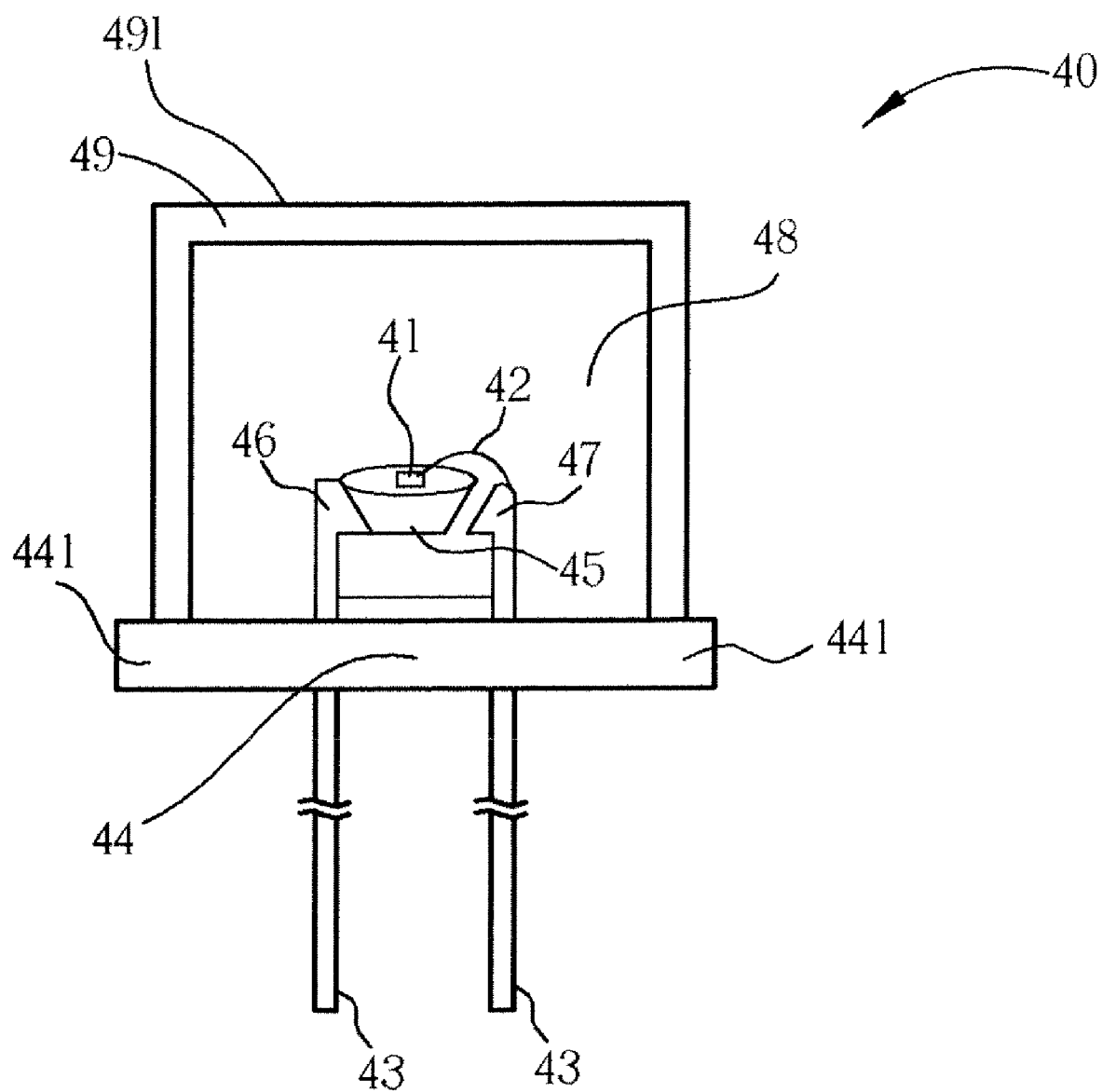
FIG. 4 is a schematic diagram of a light source in accordance with a preferred embodiment of the present invention.

Please refer to FIG. 4, which illustrates a schematic diagram of the light source 40 in accordance with a preferred embodiment of the present invention. The light source 40 includes a emitting chip 41, a wire-bond 42, two pins 43, a holder 44, a dispenser 45, a first lead frame 46, a second lead frame 47 and a housing 49. The first lead frame 46 and the second lead frame 47 are disposed on the holder 44, and the two pins 43 are also disposed on the holder 44, wherein each of the two pins 43 is coupled to the first and the second lead frames 46, 47 respectively. The dispenser 45 is coupled to the first lead frame 46. The emitting chip 41, disposed on the dispenser 45, is coupled to the second lead frame 47 via the wire-bond 42 in a wire-bond process. The emitting chip 41 is a laser diode or other optical elements. The housing 49 made of epoxy material has a substantially plane light-emitting surface 491, and light emitted by the emitting chip 41 travels through the light-emitting surface 491 to form a substantially collimated light beam. The housing 49 is formed on the holder 44 in an injection molding process or other plastic processes, and forms an isolated space 48 with the holder 44. In general, the light source 40 further includes a flange 441 which is a protrudent ring-like portion of the holder 44.

Figure 5:
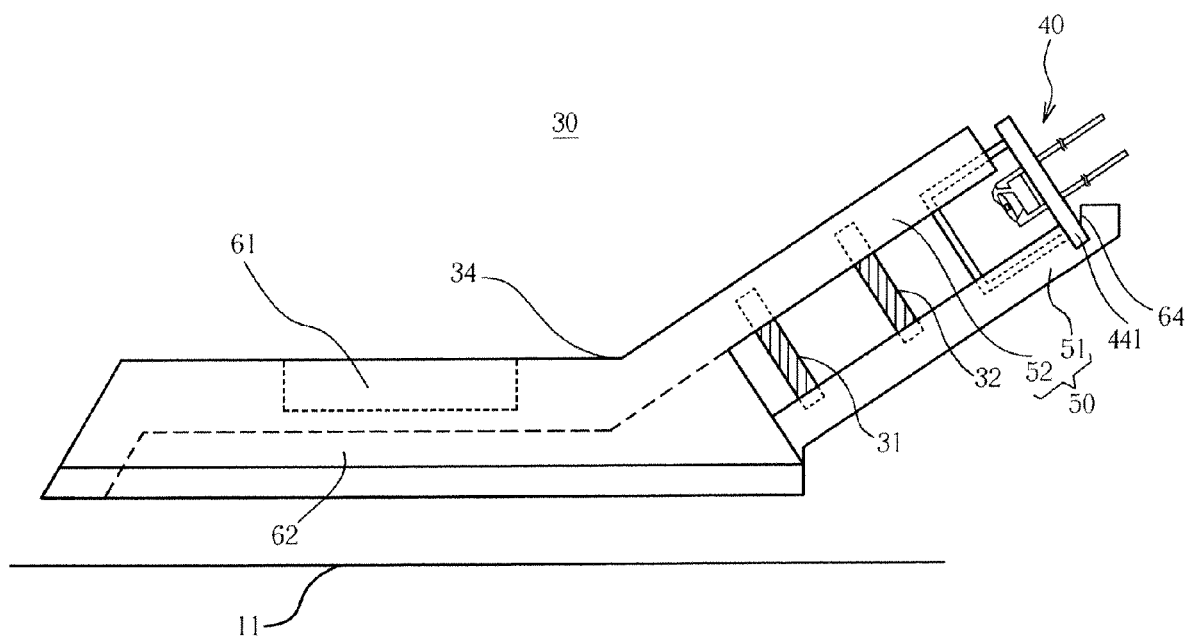
FIG. 5 is a side view of an optical module for an optical mouse in accordance with a first preferred embodiment of the present invention.

Please refer to FIG. 5, which illustrates a side view of the optical module 30 for an optical mouse in accordance with a first preferred embodiment of the present invention. In FIG. 5, the light source 40 has been fixed within the fixing portion 50 of the light-guiding unit 34 by way of which the engaging portion 64 of the first fixing member 51 fastens the flange 441 of the light source 40 at the desired position. The light-guiding unit 34, the first lens 31, and the second lens 32 are molded as a single piece in an injection molding process wherein the second lens 32 substantially focuses the light emitted by the light source 40 to a focal point of the first lens 31, and thereby the light after leaving the first lens 31 is incident onto a working surface 11 in a substantially collimated way and is reflected by the working surface 11. The reflected light from the working surface 11 travels through the second aperture 62 and the first aperture 61 sequentially and is detected by an optical sensing device(not shown) finally. Because of the injection molding process, the first lens 31 and the second lens 32 are formed firmly on the fixing portion 50. Moreover, the engaging portion 64 of the first fixing member 51 fastens firmly the flange 441 of the light source 40 at the desired position. The light emitted from the light source 40 can travel precisely onto the working surface 11 in a predetermined way without any errors, even though the optical mouse moves arbitrarily. By the aforesaid way, the recognition of the optical mouse will be improved highly and precisely. Another way to fix firmly the first lens 31 and the second lens 32 within the fixing portion 50 is to embed these two lenses in the fixing portion 50 instead of injection molding.

Figure 6:
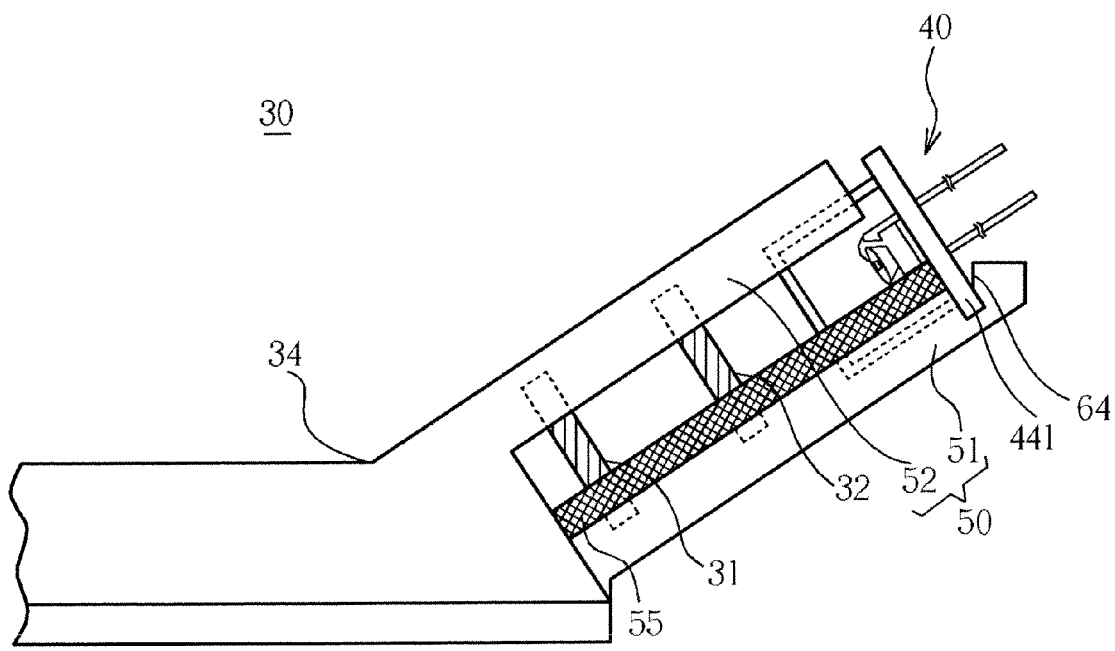
FIG. 6 is a side view of an optical module for an optical mouse in accordance with a second preferred embodiment of the present invention.

Please refer to FIG. 6, which illustrates a side view of the optical module 30 for an optical mouse in accordance with a second preferred embodiment of the present invention. The optical module 30 further comprises a sliding unit 55 dispose on the second lens 32 for fixing a first relative distance between the first lens 31 and the second lens 32, and for fixing a second relative distance between the second lens 32 and the light source 40. The sliding unit 55 is fastened firmly by the flange 441 of the light source 40 and the flange 441 is fastened firmly by the engaging portion 64 of the first fixing member 51. The light-guiding unit 34 and the first lens 31 are molded as a single piece, and the second lens 32 and the sliding unit 55 are molded as another single piece. The single piece of the second lens 32 and the sliding unit 55 can be disassemble from the single piece of the light-guiding unit 34 and the first lens 31.

Figure 7:
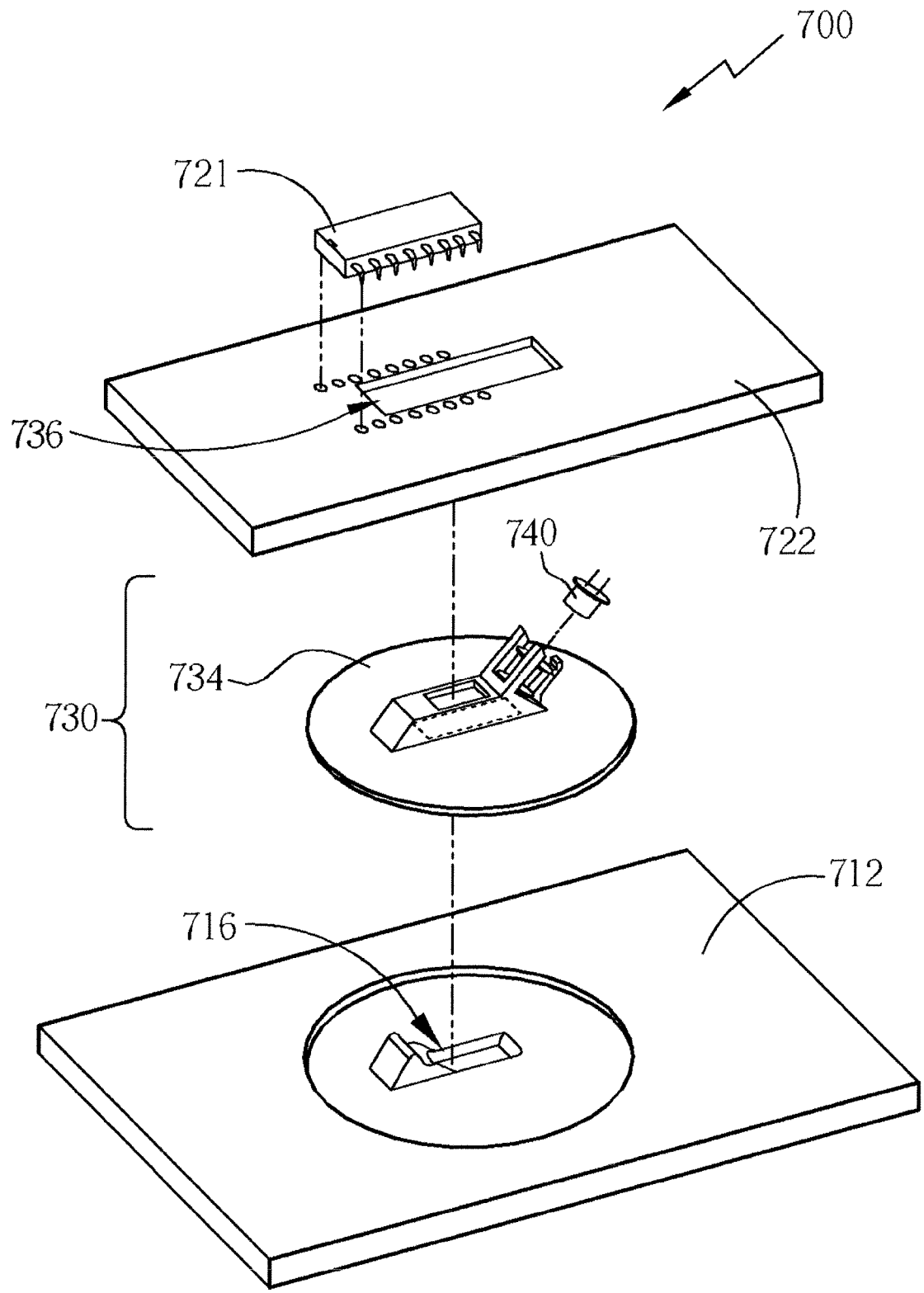
FIG. 7 is an inner assembly diagram of an optical mouse in accordance with a preferred embodiment of the present invention.

Please refer to FIG. 7, which is an inner assembly diagram of an optical mouse 700 in accordance with a preferred embodiment of the present invention. The optical mouse 700 comprises a bottom surface 712, a circuit board 722, a light sensing component 721, and an optical module 730 including a light source 740 and a light guiding unit 734. The bottom surface 712 includes an opening 716. A hole 736 is disposed on the circuit board 722. The light source 740 is coupled within the optical module 730 just like the way of the FIG. 5. The light sensing component 721 is installed to capture images displayed on a working plane where the optical mouse 700 travels over, and analyzes and determines the moving information of the optical mouse 700.

Compared to the prior arts, taking the FIG. 5 for example, the present invention is capable of fastening the light source 40 via the fixing portion 50 so as to avoiding rocks and vibrates when an optical mouse moves on the working surfacer 1. Besides, the light-guiding unit 34 and the first lens 31 are molded as a single piece, or the light-guiding unit 34, the first lens 31, and the second lens 32 are molded as a single piece so as to precisely control the second lens 32 in a predetermined position. Therefore, the recognition of the optical mouse will be improved highly and precisely.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical module for an optical mouse which moves over a working surface to detect a relative movement, comprising:
   a light source, including:
      a housing having a light-emitting surface; and
      a light emitting chip, disposed in said housing, for emitting light through said light-emitting surface of said housing;
   a light-guiding unit, including:
      a fixing portion forming a fixing space for fastening said light source; and
      a light-guiding portion for guiding said light emitted by said light source fastened in said fixing space;
   a first lens, disposed within said fixing space of said fixing portion;
   a second lens, disposed within said fixing space of said fixing portion at a position between said light source and said first lens; and
   a sliding unit, disposed on said second lens for adjusting a first relative distance between said first lens and said second lens and a second relative distance between said second lens and said light source;
   wherein said second lens substantially focuses said light emitted by said light source to a focal point of said first lens, and thereby said light after leaving said first lens being incident onto said working surface in a substantially collimated way.

2. The optical module of claim 1 wherein said housing is made of epoxy material.

3. The optical module of claim 1 wherein said housing is formed in an injection molding process.

4. The optical module of claim 1 wherein said light-emitting surface is a substantially flat plane.

5. The optical module of claim 1 wherein said light source is a coherent light source.

6. The optical module of claim 1 wherein said light source is an incoherent light source.

7. The optical module of claim 1 wherein said light-guiding unit, and said first lens are molded as a single piece.

8. The optical module of claim 1 wherein said light-guiding unit, said first lens, and said second lens are molded as a single piece.

9. The optical module of claim 1 wherein said fixing portion further comprises:
   at least two fixing members, at least one of which has an engaging portion for fastening said light source at a desired position.

10. The optical module of claim 9 wherein said engaging portion engages a flange of said light source.

11. The optical module of claim 9 wherein said second lens is formed between said fixing members by injection molding.

12. The optical module of claim 1 wherein said light-guiding portion includes a first aperture through which said light emitted by said light source is incident onto said working surface and further through which the light reflected by said working surface is incident onto an optical sensor of said optical mouse.

13. The optical module of claim 12 wherein said light-guiding portion includes a second aperture through which said light from said first aperture travels.

14. An optical module for an optical mouse which moves over a working surface to detect a relative movement, comprising:
   a light source, including:
      a housing having a light-emitting surface; and
      a light emitting chip, disposed in said housing, for emitting light through said light-emitting surface of said housing;
   a light-guiding unit for guiding said light emitted by said light source, including:
      a fixing portion forming a fixing space for fastening said light source;
      a first lens, disposed within said fixing space of said fixing portion; and
      a second lens, disposed within said fixing space of said fixing portion at a position between said light source and said first lens; and
   a sliding unit, disposed on said second lens for adjusting a first relative distance between said first lens and said second lens and a second relative distance between said second lens and said light source;
   wherein said second lens substantially focuses said light emitted by said light source to a focal point of said first lens, and thereby said light after leaving said first lens is incident onto said working surface in a substantially collimated way.

* * * * *